United States Patent
Takasaki et al.

(10) Patent No.: US 6,782,794 B2
(45) Date of Patent: Aug. 31, 2004

(54) NEGATIVE PRESSURE BOOSTING DEVICE

(75) Inventors: Yoshiyasu Takasaki, Higashimatsuyama (JP); Hidefumi Inoue, Higashimatsuyama (JP)

(73) Assignee: Bosch Automotive Systems Corporation, Tokyo (JP)

( * ) Notice: Subject to any disclaimer, the term of this patent is extended or adjusted under 35 U.S.C. 154(b) by 70 days.

(21) Appl. No.: 10/232,320

(22) Filed: Sep. 3, 2002

(65) Prior Publication Data

US 2003/0121407 A1 Jul. 3, 2003

(30) Foreign Application Priority Data

Dec. 27, 2001 (JP) ........................................ 2001-396470

(51) Int. Cl.[7] ................................................. F15B 9/10
(52) U.S. Cl. ..................................................... 91/369.2
(58) Field of Search ............................. 91/369.1, 369.2, 91/369.3, 376 R (56) References Cited

U.S. PATENT DOCUMENTS

| | | | |
|---|---|---|---|
| 4,611,526 A | | 9/1986 | Arino et al. |
| 5,794,506 A | * | 8/1998 | Inoue et al. ................ 91/369.2 |
| 5,857,399 A | * | 1/1999 | Tsubouchi et al. ......... 91/376 R |
| 6,119,577 A | * | 9/2000 | Takasaki et al. ........... 91/376 R |
| 6,209,441 B1 | | 4/2001 | Takaku et al. .............. 91/369.2 |
| 6,295,915 B1 | | 10/2001 | Watanabe ................... 91/369.2 |

* cited by examiner

Primary Examiner—Thomas E. Lazo
(74) Attorney, Agent, or Firm—Manabu Kanesaka (57) ABSTRACT

In a negative pressure boosting device, a movable valve seat is air-tightly and slidably disposed in a concavity of a valve body. The movable valve seat and a valve element compose a vacuum valve. A servo ratio changing device includes a control spring compressed and disposed between the movable valve seat and the valve body. The servo ratio changing device is provided on a valve mechanism (the vacuum valve). During operation, the valve element comes in contact with the movable valve seat. The movable valve seat does not move in a low-input range so that the servo ratio is a relatively large ratio for the normal operation. In a high-input range, the control spring starts to be compressed to move the movable valve seat, thereby changing the servo ratio to a small ratio.

4 Claims, 4 Drawing Sheets

NEGATIVE PRESSURE BOOSTING DEVICE

BACKGROUND OF THE INVENTION

The present invention relates to a negative pressure boosting device used as a brake booster or the like and, more particularly, to a negative pressure boosting device capable of exhibiting ideal input-output characteristics by providing different servo ratios for a low input range and for a high input range, respectively.

Figure 4:
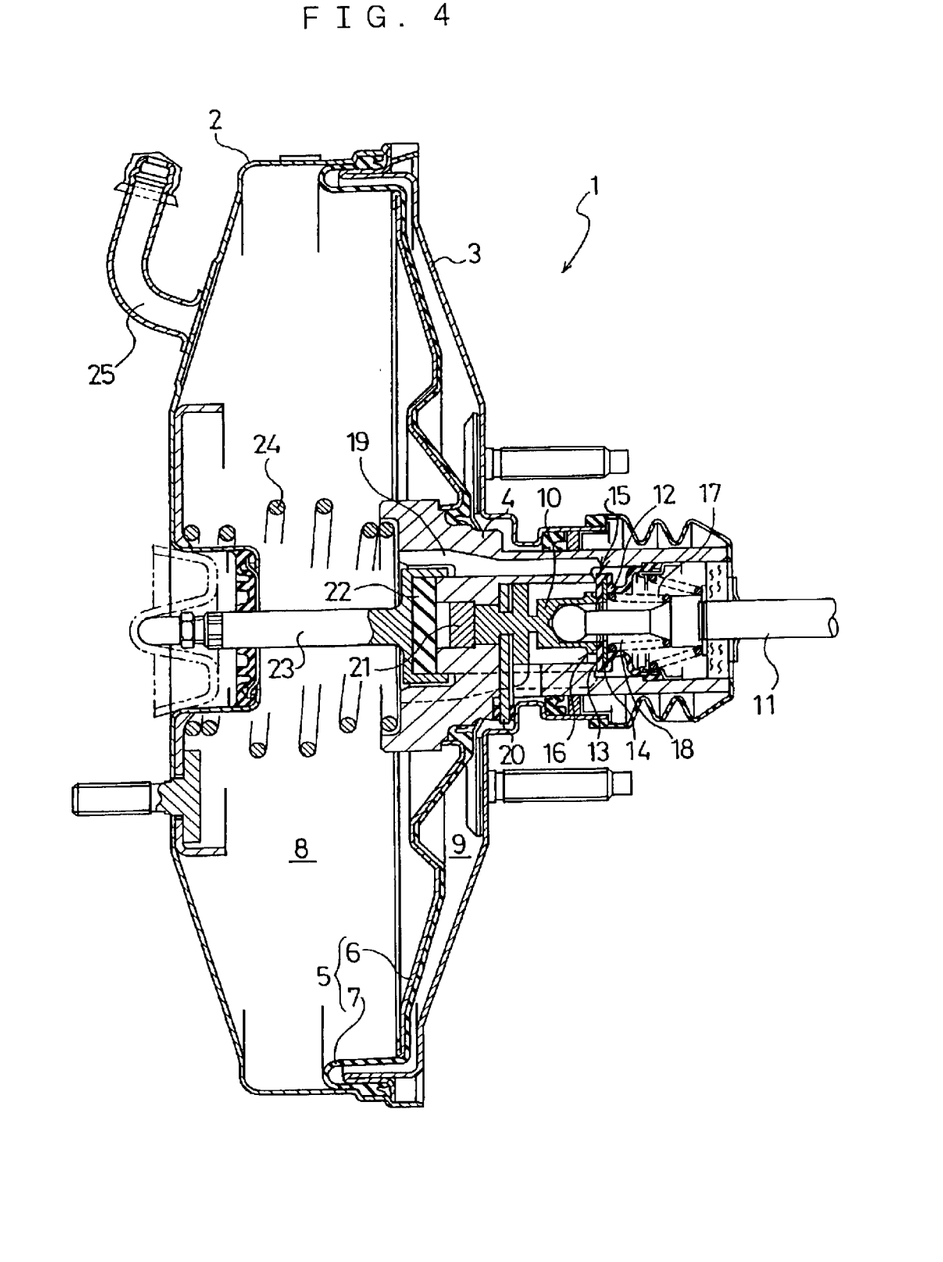
FIG. 4 is a sectional view showing the example of the conventional typical negative pressure boosting device.

Conventionally, a negative pressure boosting device utilizing negative pressure is used as a brake booster in an automobile such as a passenger car. As an example of conventional typical negative pressure boosting devices, a negative pressure boosting device as shown in FIG. 4 is known. In FIG. 4, numeral 1 designates a negative pressure boosting device, 2 designates a front shell, 3 designates a rear shell, 4 designates a valve body, 5 designates a power piston comprising a power piston member 6 attached to the valve body 4 and a diaphragm 7 disposed between the shells 2 and 3, 8 designates a constant pressure chamber which is formed in a space between the shells 2 and 3 and is defined by the power piston 5 and into which negative pressure is always introduced, 9 designates a variable pressure chamber which is formed in the space between the shells 2 and 3 and is defined by the power piston 5 and into which atmospheric pressure is introduced during operation, 10 designates a valve plunger, 11 designates an input shaft connected to a brake pedal (not shown), 12 designates a valve element, 13 designates a first valve seat which is annular and is formed on the valve body 4, 14 designates a second valve seat which is annular and is formed on the valve plunger 10, 15 designates a vacuum valve composed of the valve element 12 and the first valve seat 13, 16 designates an atmospheric valve composed of the valve element 12 and the second valve seat 14, 17 designates a valve spring always biasing the valve element 12 in such a direction as to seat the valve element 12 onto the first valve seat 13, 18 designates an atmosphere inlet, 19 designates a vacuum passage, 20 designates a key member for restricting the movement of the valve plunger 10 relative to the valve body 4 to a predetermined value and defining the rear most positions of the valve body 4 and the valve plunger 10, 21 designates a spacer, 22 designates a reaction disk, 23 designates an output shaft, 24 designates a return spring, and 25 designates a vacuum pressure inlet. The vacuum valve 15 and the atmospheric valve 16 compose a valve mechanism of the conventional example.

In the negative pressure boosting device 1 having the aforementioned structure, negative pressure is always introduced into the constant pressure chamber 8 through the vacuum pressure inlet 25. In the inoperative state of the negative pressure boosting device 1, the valve body 4, the power piston 5, the valve plunger 6, the input shaft 11, and the output shaft 23 are positioned as shown in FIG. 4. In these positions, the vacuum valve 15 is open and the atmospheric valve 16 is closed. That is, the variable pressure chamber 9 is in communication with the constant pressure chamber 8 via the open vacuum valve 15 and the vacuum passage 19 and is isolated from the atmosphere. Therefore, negative pressure is introduced into the variable pressure chamber 9 so that there is no difference in pressure between the variable pressure chamber 9 and the constant pressure chamber 8.

Upon depression of the brake pedal for normal braking operation, the input shaft 11 is moved forward to move the valve plunger 10 forward. Accordingly, the valve element 12 is seated on the first valve seat 13 and the second valve seat 14 is spaced apart form the valve element 12 so as to close the vacuum valve 15 and open the atmospheric valve 16. That is, the variable pressure chamber 9 is isolated from the constant pressure chamber 8 and is in communication with the atmosphere. Therefore, the atmosphere is introduced into the variable pressure chamber 9 through the atmosphere inlet 18 and the open atmospheric valve 16. The result is a difference in pressure between the variable pressure chamber 9 and the constant pressure chamber 8. Because of the differential pressure, the power piston 5 is moved forward and the output shaft 23 is moved forward via the valve body 4 so as to move the piston of a master cylinder (not shown).

In the very initial stage of operation of the negative pressure boosting device 1, the forward movement of the valve plunger 10 moves the spacer 21, but the spacer 21 does not come in contact with the reaction disk 22 yet. Therefore, the reaction force is not transferred from the output shaft 23 to the brake pedal through the reaction disk 22, the spacer 21, the valve plunger 10, and the input shaft 11. As the input shaft 11 is further moved forward, the power piston 5 is also further moved forward so as to further move the piston of the master cylinder forward via the valve body 4 and the output shaft 23. Then, the valve plunger 10 and the spacer 21 are also further moved forward so that the spacer 21 comes in contact with the reaction disk 22. As a result, the reaction force is transferred from the output shaft 23 to the brake pedal through the reaction disk 22, the spacer 21, the valve plunger 10, and the input shaft 11. That is, the negative pressure boosting device 1 produces output corresponding to the input, thus exhibiting the jumping characteristic.

As the output of the negative pressure boosting device 1 reaches a predetermined value that is obtained by boosting the input of the input shaft 11 exerted with a pedaling force in accordance with a servo ratio, the atmospheric valve 16 and the vacuum valve 15 are both closed. In this state, the device becomes in the intermediate load state. Because of the output of the vacuum boosting device 1, the master cylinder produces braking pressure so that the wheel cylinders produce relatively large braking force i.e. boosted pedaling force, thereby operating the service braking.

As the brake pedal is released to cancel the braking operation from the state where the negative pressure boosting device 1 is in operation so that the atmospheric valve 16 and the vacuum valve 15 are both closed, the input shaft 11 and the valve plunger 10 are both moved backward. Therefore, the second valve seat 14 presses the valve element 12 backward so that the valve element 12 is spaced apart from the first valve seat 13 so as to open the vacuum valve 15. That is, the variable pressure chamber 9 is isolated from the atmosphere and is in communication with the constant pressure chamber 8. Accordingly, the atmosphere in the variable pressure chamber 9 is discharged to the constant pressure chamber 8 through the open vacuum valve 15 and the vacuum passage 19 and is then discharged further form the constant pressure chamber 8 to a vacuum source (not shown) through the vacuum inlet 25. As a result of this, by the spring force of the return spring 24, the valve body 4 and the power piston 5 are moved backward to the inoperative position shown in FIG. 4. According to the backward movement of the valve body 4, the output shaft 23 is also moved backward because of the spring force exerted by the return spring of the piston of the master cylinder, thereby canceling the service braking.

As the negative pressure boosting device 1 becomes in the full load range in the state that the pedaling force is great, i.e.

the input of the negative pressure boosting device 1 is great, the boosting action according to the servo ratio of the negative pressure boosting device 1 is no more conducted so that the increase in output of the negative pressure boosting device 1 is proportional to the input of the negative pressure boosting device.

Figure 2:
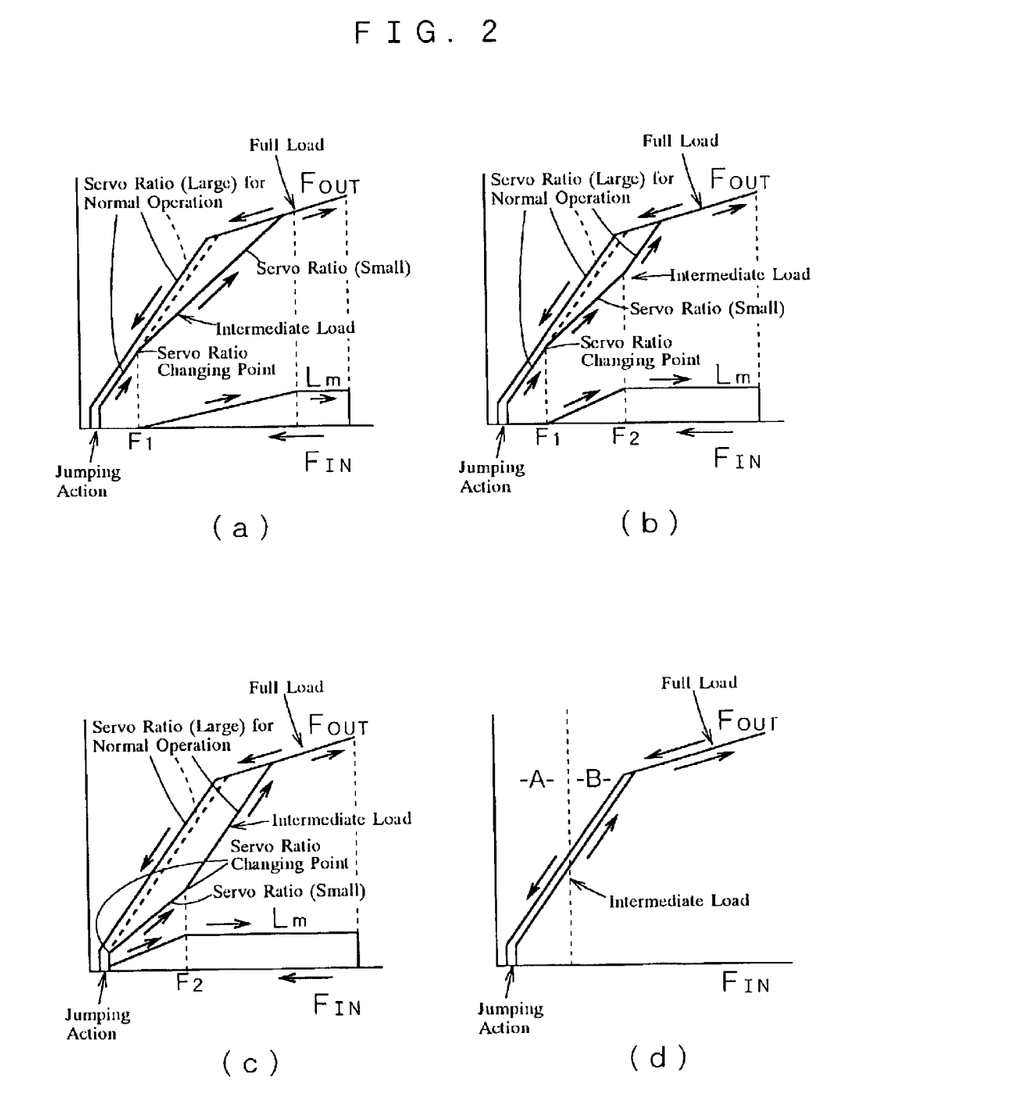
FIG. 2(a) is a graph indicating the input-output characteristic in the embodiment of the negative pressure boosting device.
FIG. 2(b) is a graph indicating the input-output characteristic in another embodiment of the present invention.
FIG. 2(c) is a graph showing the input-output characteristic in further another embodiment of the present invention.
FIG. 2(d) is a graph showing the input-output characteristic in a comparative example of a conventional negative pressure boosting device.

The aforementioned input-output characteristics of the conventional typical negative pressure boosting device 1 is shown in FIG. 2(d). After the jumping action is finished, the output is linearly increased according to the increase in input. Upon releasing the brake pedal when the input is in the intermediate load range of the negative pressure boosting device 1, the output is decreased along the same way as the increasing way according to the decrease in input. Upon releasing the brake pedal when the input is in the full load range over the intermediate load range, the output is decreased along a way of the full load range and is then decreased along a straight way to have such a hysteresis that the output is slightly greater than the output in the increasing way relative to the same input in the intermediate load range.

However, in FIG. 2(d), the negative pressure boosting device 1, as a conventional typical negative pressure boosting device, performs according to the input-output characteristic within a A-range when normal braking action is taken during the running of the vehicle in an urban area, while the negative pressure boosting device 1 performs according to the input-output characteristic within a B-range when braking action is taken with depression force stronger than that of the normal braking action, for example, for panic braking.

In recent years, it is required to ensure the controllability of brakes within the A-range corresponding to the normal braking action and it is required to make a driver to be aware of the stiff feeling (feeling as hard response from the brake pedal) within the B-range when the brake pedal is depressed with force stronger than that of the normal braking action.

As described concretely, as for the controllability of the brakes within the A-range, it is required that the output of the negative pressure boosting device is promptly varied (increased or decreased) corresponding to the variation (increase or decrease) in the input by braking action even with a little variation, thereby minimizing the hysteresis the input-output characteristic between in the input increasing way and the input decreasing way of the negative pressure boosting device 1.

On the other hand, in the B-range, for example, for panic braking with strong brake operating force, increased stiff feeling is required to make the driver to be aware of the strong braking operation. Of course, the output is required to be promptly decreased according to the releasing operation of the brake pedal. However, in this case, it is required to increase the hysteresis of input-output characteristic between the input increasing way and the input decreasing way of the negative pressure boosting device in order to prevent the output from being varied by a little increase in operational input.

However, in the conventional negative pressure boosting device 1, the input-output characteristics in the A-range and in the B-range are the same as shown in FIG. 2(d). That is, in the conventional negative pressure boosting device 1, the "stiff feeling" should be insufficient when the "controllability of brakes" takes priority, while the "controllability of brakes" should be poor when the "stiff feeling" takes priority. It is difficult to improve the "controllability of brakes" and to improve the "stiff feeling" at the same time.

SUMMARY OF THE INVENTION

It is an object of the present invention to provide a negative pressure boosting device in which the improvement of "controllability of brakes" in a low-input range and the improvement of "stiff feeling" in a high-input range are compatible.

To achieve the above-mentioned object, a negative pressure boosting device of the present invention comprises at least: a valve body which is disposed slidably relative to the inside of a space defined by a shell and air-tightly and slidably penetrates said shell; a power piston, connected to said valve body, for dividing said space into a constant pressure chamber into which negative pressure is introduced and a variable pressure chamber into which atmosphere is introduced during braking operation; a valve plunger which is slidably disposed in said valve body; an input shaft which connected to said valve plunger and is slidably disposed in said valve body; and a valve mechanism comprising a vacuum valve, which is disposed in said valve body and is controlled by the movement of said valve plunger to isolate or allow the communication between said constant pressure chamber and said variable pressure chamber, and an atmospheric valve which is disposed in said valve body and is controlled by the movement of said valve plunger to isolate or allow the communication between said variable pressure chamber and the atmosphere, and is characterized in that said valve mechanism is provided with a servo ratio changing means for changing the servo ratio during operation after input is initially exerted on said input shaft and before the input reaches the end of an intermediate load range.

Further, the present invention is characterized in that said servo ratio changing means sets the servo ratio to a ratio smaller than the servo ratio for the normal braking operation, or sets the servo ratio to a ratio smaller than the servo ratio for the normal braking operation and, after that, sets the servo ratio to the servo ratio for the normal braking operation again.

Furthermore, the present invention is characterized in that said vacuum valve is composed of a valve element which receives working pressure corresponding to the input exerted on said input shaft to move in the working direction, and a movable valve seat on which said valve element is seated and which is movable relative to the valve body, and said servo ratio changing means is composed of said movable valve seat and a control spring for controlling the start of movement of said movable valve seat relative to said valve body.

Moreover, the present invention is characterized in that said movable valve seat is always biased by the biasing force of said control spring toward the inoperative position and has a stopper which is engagable with said valve body, wherein the inoperative position of said movable valve seat is defined by that said stopper is engaged with said valve body by the biasing force of said control spring.

In addition, the present invention is characterized in that said movable valve seat is disposed slidably along the inner surface of a concavity formed in said valve body and that said control spring is compressed and disposed between said valve body and said movable valve seat.

In the negative pressure boosting device of the present invention having the aforementioned structure, the servo ratio can be changed during operation after input is initially exerted on the input shaft and before the input reaches the end of the intermediate load range of the negative pressure boosting device by the servo ratio changing means. Therefore, the servo ratio can be suitably set by the servo ratio changing means, thereby improving the controllability of the brakes in the low-input range, for example during service braking, and also giving the feeling as hard response, i.e. the stiff feeling to the driver in the high-input range, for example, during panic braking.

Since the servo ratio changing means is provided in the valve mechanism, the servo ratios can be advantageously and reliably changed by the servo ratio changing means.

Since the servo ratio changing means sets the servo ratio to a ratio smaller than the servo ratio for the normal braking operation, or sets the servo ratio to a ratio smaller than the servo ratio for the normal braking operation and then sets the servo ratio to the servo ratio for the normal braking operation again, thereby improving the controllability of brakes in the low-input range, while more properly giving the feeling as hard response, i.e. the stiff feeling to the driver, for example, during panic braking in the high-input range.

The servo ratio changing means is composed of a movable valve seat of a vacuum valve and a control spring for controlling the start of movement of the movable valve seat relative to a valve body, thereby simplifying the structure of the servo ratio changing means.

Further, a stopper is engaged with the valve body by the biasing force of a control spring so as to define the inoperative position of the movable valve seat, thereby easily controlling the inoperative position of the movable valve seat.

Furthermore, the movable valve seat is disposed slidably along the inner surface of the concavity formed in the valve body and the control spring is compressed and disposed between the valve body and the movable valve seat, thereby simplifying the structure of the valve mechanism even through it includes the servo ratio changing means.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 2(a)–2(d) show the input-output characteristics in respective embodiments and a comparative example of the negative pressure boosting devices, wherein

DESCRIPTION OF THE PREFERRED EMBODIMENTS

Hereinafter, embodiments of the present invention will now be described with reference to drawings.

Figure 1:
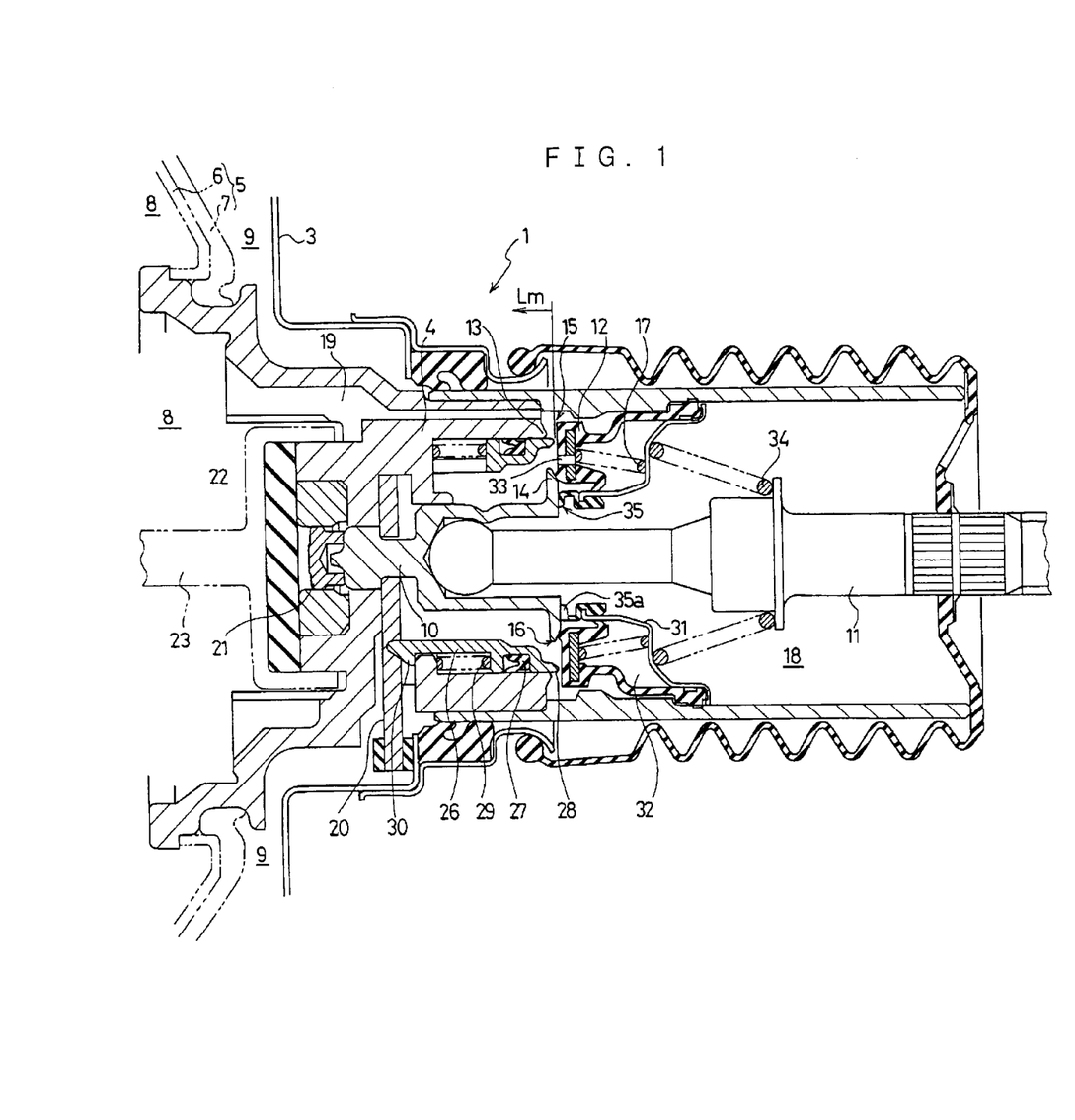
FIG. 1 is a partially enlarged sectional view showing a vacuum valve and an atmospheric valve in one embodiment of a negative pressure boosting device according to the present invention.

FIG. 1 is a partially enlarged sectional view showing a vacuum valve and an atmospheric valve in one embodiment of the negative pressure boosting device according to the present invention. It should be noted that component parts similar or corresponding to the parts of the conventional example shown in FIG. 4 are designated with the same reference numerals, thus omitting the detail description of such component parts.

As shown in FIG. 1, a negative pressure boosting device 1 of this embodiment is similar to the aforementioned conventional negative pressure boosting device 1 shown in FIG. 4, but is different in that a cylindrical member 26 is located inside an annular first valve seat 13 in a concavity formed in a valve body 4 and is slidably fitted air-tightly by a cup seal 27 to the inner surface of the concavity. Disposed on the rear end (the right end in FIG. 1) of the cylindrical member 26 is an annular movable valve seat 28 on which a valve element 12 is seated. The valve element 12 receives operational pressure according to the input exerted on an input shaft 11 and is thus moved in the operational direction. In the negative pressure boosting device 1 of this embodiment, a movable valve seat 28 and the valve element 12 compose a vacuum valve 15.

The cylindrical member 26 is always biased in a direction toward the valve element 12 by a control spring 29 for changing the servo ratio which is compressed and disposed between the valve body 4 and the cylindrical member 26. The cylindrical member 26 is formed at its front end with a stopper 30 composed of an engaging projection. In the inoperative state of the negative pressure boosting device 1, as shown in FIG. 1, the stopper 30 is engaged with the valve body 4 so that the cylindrical member 26 is in the rearmost position relative to the valve body 4. That is, the stopper 30 is engaged with the valve body 4 by the biasing force of the control spring 29, thereby defining the inoperative position of the movable valve seat 28. In the inoperative position of the movable valve seat 28, the movable valve seat projects rearward from the first valve seat 13 by a predetermined value.

The set load of the control spring 29 is set to such a value as to start its compression, i.e. that the cylindrical member 26 starts to move, when the input of the input shaft 11 reaches a preset value $F_1$. In addition, the negative pressure boosting device 1 is set to reach the full load range before the valve element 12 is seated on the first valve seat 13 because of the movement of the cylindrical member 26. Moreover, the valve element 12 is seated on the first valve seat 13 before the front end of the cylindrical member 26 comes in contact with the valve body 4. The movable valve seat 28 and the control spring 29 compose a servo ratio changing means of the present invention provided on the valve mechanism (vacuum valve 15) for controlling the pressure in a variable pressure chamber 9 relative to a constant pressure chamber 8.

In the negative pressure boosting device 1 of this embodiment, an annular chamber 32 is formed between a cylindrical valve element supporting member 31 for supporting the valve element 12 and the valve element 12. The annular chamber 32 is isolated from the atmosphere and is always in communication with a space inside the annular movable valve seat 28 through a hole 33 formed in the valve element 12.

By the valve spring 17 compressed and disposed in the chamber 32, the valve element 12 is always biased forward i.e. toward the valve seats similarly to the conventional example. The valve element supporting member 31 is always biased forward (to the left in FIG. 1) by a spring 34 compressed and disposed between the input shaft 11 and the valve element supporting member 31.

Disposed on the front end of the valve element supporting member 31 is a flow control valve 35 made of an elastic material such as rubber. The flow control valve 35 is set to be in contact with the rear end of the valve plunger 10 in the inoperative state shown in FIG. 1 and is spaced apart form the rear end of the valve plunger 10 when a second valve seat 14 at the rear end of the valve plunger 10 is spaced apart from the valve element 12 by a predetermined value. The flow control valve 35 is provided with a slit 35a for limiting the flow rate of atmosphere to a predetermined rate.

The other structure of the negative pressure boosting device 1 of this embodiment is the same as that of the aforementioned conventional negative pressure boosting device 1.

In the negative pressure boosting device 1, in the inoperative state shown in FIG. 1, the valve element 12 is seated on the first valve seat 14 similarly to the conventional example and the movable valve seat 28 is spaced apart from the valve element 12. That is, similarly to the conventional example, the atmospheric valve is closed and the vacuum valve is open so that the variable pressure chamber 9 is isolated from the atmosphere and is in communication with the constant pressure chamber 8. Therefore, negative pressure is introduced from the constant pressure chamber 8 into the variable pressure chamber 9 so that there is substantially no differential pressure between the variable pressure chamber 9 and the constant pressure chamber 8. Therefore, the power piston 5 is in the inoperative position.

The negative pressure is also introduced into the chamber 32 so that no differential pressure acts on the valve element 12. The valve element 12 is pressed against the second valve seat 14 with a relatively small force only by the spring force of the valve spring 17. Therefore, the second valve seat 14 is not damaged.

As the brake pedal is depressed to exert input corresponding to the pedaling force onto the input shaft 11 so as to move the input shaft 11 forward, the valve plunger 10 is moved forward. Accordingly, the valve element 12 is seated on the movable valve seat 28 and the second valve seat 14 is spaced apart form the valve element 12 so as to close the vacuum valve and open the atmospheric valve. As a result, the variable pressure chamber 9 is isolated from the constant pressure chamber 8 and is in communication with the atmosphere. Then, similarly to the conventional example, the atmosphere is introduced into the variable pressure chamber 9 through the open atmospheric valve. During this, however, the flow control valve 35 is still in contact with the rear end of the valve plunger 10, so that the atmosphere is introduced through the slit 35a at a limited flow rate. Therefore, noise generated during the introduction of atmosphere can be prevented.

After that, by the further forward movement of the valve plunger 10, the rear end of the valve plunger 10 is spaced apart from the flow control valve 35. In this state, the flow rate of atmosphere is no longer limited by the flow control valve 35 so that the atmosphere is introduced into the variable pressure chamber 9 through the atmospheric valve which is open similarly to the conventional example. At this point, a spacer 21 adjacent to the valve plunger 10 does not come in contact with a reaction disk 22 yet. Therefore, the reaction force is not transferred to the brake pedal.

After that, similarly to the aforementioned conventional example, as the input of the input shaft further rises and the valve plunger 10 is thus moved forward, the spacer 21 comes in contact with the reaction disk 22 so that the reaction force is transferred to the brake pedal, thereby exhibiting the jumping characteristic. At this point, since the pressing force of the valve element 12 to the control spring 29 is smaller than the set load so that the control spring 29 does not start to be compressed yet, the movable valve seat 28 does not move relative to the valve body 4. Therefore, the output of the negative pressure boosting device 1 rises according to the increase in input by a normal servo ratio similarly to the conventional example. As shown in FIG. 2(a), its input-output characteristic is the same as that of the conventional example shown in FIG. 2(d). Therefore, the controllability of brakes can be improved in the low-input range in the same way of the conventional example.

As the input of the input shaft 11 rises to reach the preset value $F_1$, the pressing force of the valve element 12 to the movable valve seat 28 exceeds the set load of the control spring 29 so that the control spring 29 starts to be compressed. Then, the cylindrical member 26 starts to move relative to the valve body 4. That is, the movable valve seat 28 starts to move forward. This means that the servo ratio changing means starts to operate.

As shown in FIG. 2(a), the input-output characteristic of the negative pressure boosting device 1 is indicated by a straight line for the lower input range in which the input is lower than the preset value $F_1$ and a straight line for the high-input range in which the input exceeds the preset value $F_1$, wherein the inclination of the straight line for high-input range is gentler than that of the straight line for the low-input range. That is, in the high-input range for the input exceeding the preset value $F_1$, the servo ratio is smaller than the normal servo ratio. Therefore, the driver can be given the feeling as hard response, i.e. the stiff feeling. In this way, the servo ratio is changed for the intermediate load range because of the actuation of the servo ratio changing means.

According to the input $F_{IN}$ of the input shaft 11, the stroke $L_m$ of the movable valve seat 28 at this point can be given by:

$$L_m = (F_{pd} + F_{sp0} - F_{ss0})/(K_{sp} + K_{ss}) \quad (1)$$

wherein $F_{pd}$ is a force of pressing the vale element supporting member 31 through the spring 34, $F_{sp0}$ is a spring force of the valve spring 17, $K_{sp}$ is a spring constant of the valve spring 17, $F_{ss0}$ is a spring force of the control spring 29, and $K_{ss}$ is a spring constant of the valve spring 17.

In the above expression (1), $F_{pd}$ is a force which is exerted on the pressure receiving area of the valve element 12 by that atmospheric pressure is introduced into the variable pressure chamber 9 according to the operation of the input shaft 11 and is thus substantially proportional to the input $F_{IN}$ of the input shaft 11. Accordingly, the stroke $L_m$ of the movable valve seat is linearly increased according to the increase in input $F_{IN}$.

The position of the movable valve seat 28 is determined to have a balance between the force of the valve spring 17 engaged with the movable valve seat 28 and the forward force of the valve element 12 moving forward according to the increase in inner pressure of the variable pressure chamber 9.

Since the negative pressure boosting device 1 of this embodiment becomes in the full load range before the valve element 12 is seated on the first valve seat 13, the input-output characteristic is indicated by a straight line in which the increase in output is linearly increased according to the increase in input (i.e. the increase in pedaling force) as shown in FIG. 2(a), similarly to the conventional example shown in FIG. 2(d).

As the valve plunger 10 is further moved forward, the valve element 12 is seated on the first valve seat 13. Therefore, the cylindrical member 26 (i.e. the movable valve seat 28) is no longer moved forward so that the stroke $L_m$ of the movable valve seat 28 becomes constant as shown in FIG. 2(a).

As the brake pedal is released, the output of the negative pressure boosting device 1 of this embodiment is decreased according to the decrease in input of the input shaft 11 along a way having such a hysteresis similar to that of the conventional example shown in FIG. 2(d) and then becomes in the inoperative state. The stroke $L_m$ of the movable valve seat 28 relative to the valve body 4 becomes 0 because the stopper 30 is engaged with the valve body 4 upon releasing the brake pedal as shown in FIG. 1. The movable valve seat 28 becomes in the inoperative position relative to the valve body 4.

As described above, by the movable valve seat 28 and the control spring 29 composing the servo ratio changing means, the negative pressure boosting device 1 of this embodiment has an input-output characteristic in which the normal servo ratio is set for a low-input range, thereby improving the controllability of brakes during the operation of service braking, while a servo ratio smaller than the normal servo ratio is set for a high-input range, thereby giving the feeling as hard response, i.e. the stiff feeling to the driver, for example, during panic braking.

According to the negative pressure boosting device 1 of this embodiment, the movable valve seat 28 and the control spring 29 composing the servo ratio changing means are disposed on the valve mechanism, thereby obtaining improved controllability of changing of servo ratios by the servo ratio changing means.

Since the first valve seat 13 of the conventional negative pressure boosting device is used and the stroke of the movable valve seat 28 relative to the valve body 4 is limited to the predetermined value, the negative pressure boosting device 1 of this embodiment can be easily formed by a simple change of design such as just adding the movable valve seat 28 and the control spring 29 to the design of the conventional negative pressure boosting device.

The servo ratio changing means is composed of the movable valve seat 28 of the vacuum valve 15 and the control spring 29 for controlling the start of movement of the movable valve seat 28 relative to the valve body 4, thereby simplifying the structure of the servo ratio changing means.

Further, the stopper 30 is engaged with the valve body 4 by the biasing force of the control spring 29 so as to define the inoperative position of the movable valve seat 28, thereby easily controlling and securely setting the inoperative position of the movable valve seat 28 with a simple structure.

Since the movable valve seat 28 is disposed slidably along the inner surface of the concavity formed in the valve body 4 and the control spring 29 is compressed and disposed between the valve body 4 and the movable valve seat 28, the structure of the valve mechanism including the servo ratio changing means can be simple even with the servo ratio changing means.

Figure 3:
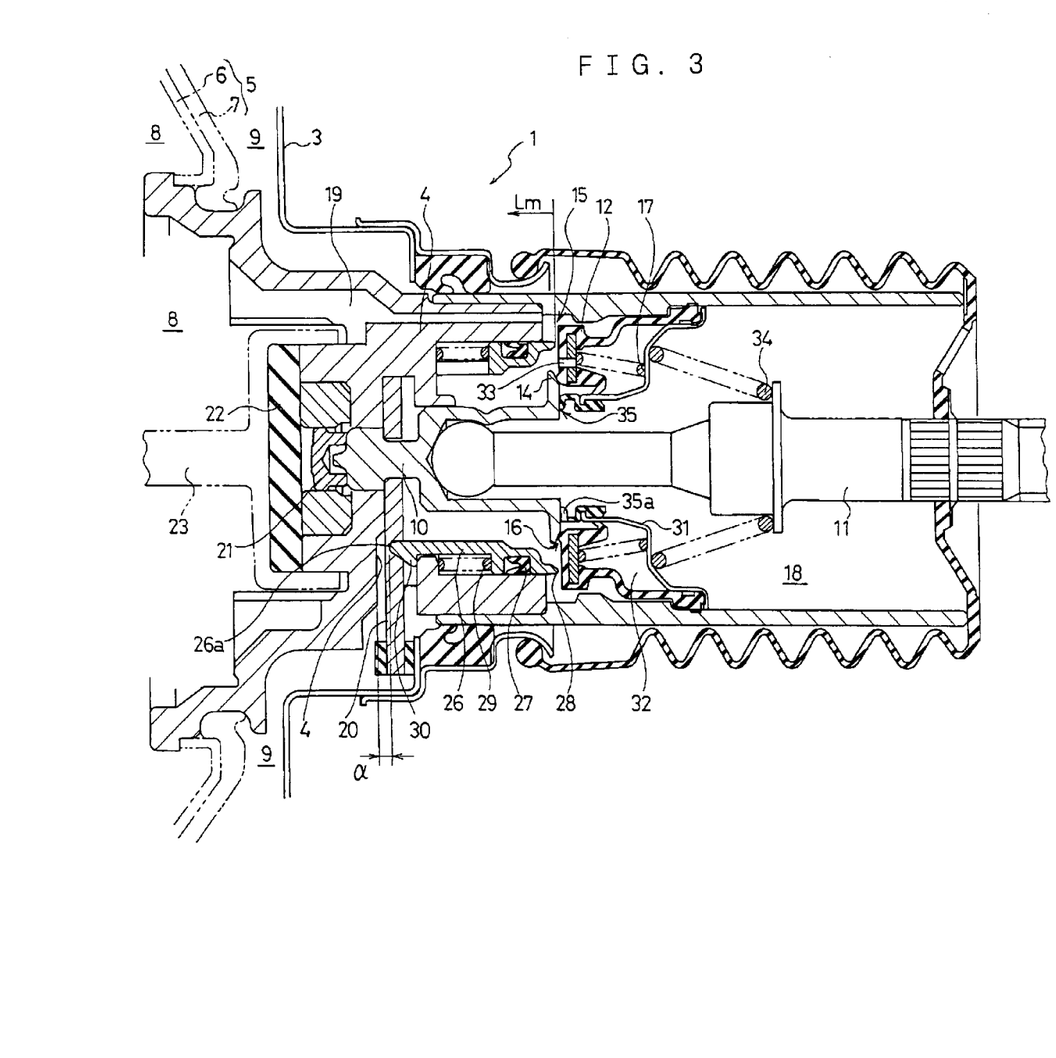
FIG. 3 is a partially enlarged sectional view similar to FIG. 1, but showing a vacuum valve and an atmospheric valve in another embodiment of a negative pressure boosting device according to the present invention.

FIG. 3 is a partially enlarged sectional view similar to FIG. 1, but showing another embodiment according to the present invention. It should be noted that component parts similar or corresponding to the parts of the conventional example shown in FIG. 4 and the embodiment shown in FIG. 1 are designated with the same reference numeral, thus omitting the detail description of such component parts.

In the aforementioned embodiment shown in FIG. 1, the same first valve seat 13 as that of the conventional example is provided on the valve body 4 and the stroke of the movable valve seat 28 relative to the valve body 4 is limited to the predetermined value by the first valve seat 13. In a negative pressure boosting device 1 of this embodiment, however, as shown in FIG. 3, such a first valve seat 13 is not provided on a valve body 4. Instead of this, a space between a front end 26a of a cylindrical member 26 and a corresponding portion 4a of the valve body 4 is set to a predetermined value α, and a means for bringing the front end 26a of the cylindrical member 26 into contact with the corresponding portion 4a of the valve body 4 is employed. In this case, the predetermined value α is set so as to bring the front end 26a of the cylindrical member 26 into contact with the corresponding portion 4a of the valve body 4 after the negative pressure boosting device 1 reaches the full load range.

The other structure of the negative pressure boosting device 1 of this embodiment is the same as that of the aforementioned embodiment shown in FIG. 1.

In the negative pressure boosting device 1 of this embodiment having the above structure, after the movable valve seat 28 is moved relative to the valve body 4 and then the negative pressure boosting device 1 reaches the full load range similarly to the aforementioned embodiment shown in FIG. 1, the front end 26a of the cylindrical member 26 comes in contact with the corresponding portion 4a of the valve body 4. Therefore, the stroke $L_m$ of the movable valve seat 28 relative to the valve body 4 becomes constant.

The other works of the negative pressure boosting device 1 of this embodiment are the same as those of the aforementioned embodiment shown in FIG. 1. The effects of the negative pressure boosting device 1 of this embodiment are the same as those of the aforementioned embodiment shown in FIG. 1, except the effect of providing the first valve seat 13.

FIG. 2(b) is a graph similar to the FIG. 2(a), but showing the input-output characteristic according to further another embodiment of the present invention. It should be noted that component parts similar or corresponding to the parts of the conventional example shown in FIG. 4 and the embodiments shown in FIG. 1 and FIG. 3 are designated with the same reference numerals, thus omitting the detail description of such component parts.

In the aforementioned embodiment shown in FIG. 1, the valve element 12 is seated on the first valve seat 13 after the negative pressure boosting device 1 reaches the full load range, thereby stopping the cylindrical member 26 from moving relative to the valve body 4 and making the stroke $L_m$ of the movable valve seat 28 relative to the valve body 4 constant. In the negative pressure boosting device 1 of this embodiment, however, as shown in FIG. 2(b), a valve element 12 is seated on a first valve seat 13 when the input of the input shaft 11 is at a preset valve $F_2$ ($F_2 > F_1$) in the intermediate load range before the negative pressure boosting device reaches the full load range, thereby stopping the cylindrical member 26 from moving relative to the valve body 4 and making the stroke $L_m$ of the movable valve seat 28 relative to the valve body 4 constant.

The other structure of the negative pressure boosting device 1 of this embodiment is the same as that of the aforementioned embodiment shown in FIG. 1.

In the negative pressure boosting device 1 of this embodiment having the above structure, similarly to the aforementioned embodiment shown in FIG. 1, as the input reaches the preset value $F_1$, the movable valve 28 starts to move relative to the valve body 4 so that the servo ratio is changed to be smaller than the servo ratio for the normal operation as shown in FIG. 2(b). As the input reaches the preset value $F_2$ in the intermediate load range before the negative pressure boosting device 1 reaches the full load range, the valve element 12 comes in contact with the first valve seat 13 so as to stop the movable valve seat 28 from moving relative to the valve body 4 and making the stroke $L_m$ of the movable valve seat 28 constant as shown in FIG. 2(b). After that, the movable valve seat 28 moves together with the valve body 4 so that the servo ratio is changed to the ratio for the normal operation.

In the negative pressure boosting device 1 of this embodiment having the above structure, similarly to the aforementioned embodiment shown in FIG. 1, the servo ratio is set to be smaller than the ratio for the normal operation for the high-input range in the intermediate load range. To prevent the servo ratio to be too small according to the increase of input, the servo ratio is returned to the ratio for the normal operation after the input exceeds the preset value $F_2$. Therefore, the driver can be given further suitable stiff feeling.

The other works and effects of the negative pressure boosting device 1 of this embodiment are the same as those of the aforementioned embodiment shown in FIG. 1.

Also in the negative pressure boosting device 1 shown in FIG. 3, the predetermined value α of the space can be set such that the front end 26a of the cylindrical member 26 comes in contact with the corresponding portion 4a of the valve body 4 when the input of the input shaft 11 reaches the preset value $F_2$ in the intermediate load range before the negative pressure boosting device 1 reaches the full load range, thereby obtaining the input-output characteristic shown in FIG. 2(b). The effects of this case are the same as the effects of the aforementioned negative pressure boosting device 1 having the input-output characteristic shown in FIG. 2(b), except the effect of providing the first valve seat 13 of the aforementioned embodiment shown in FIG. 1.

FIG. 2(c) is a graph similar to the FIG. 2(a), but showing the input-output characteristic according to still another embodiment of the present invention. It should be noted that component parts similar or corresponding to the parts of the conventional example shown in FIG. 4 and the embodiment shown in FIG. 1 are designated with the same reference numerals, thus omitting the detail description of such component parts.

In any of the aforementioned embodiments shown in FIG. 1, FIG. 2(b) and FIG. 3, the servo ratio is changed in the intermediate load range after the negative pressure boosting device 1 conducts the jumping action. In the negative pressure boosting device 1 of this embodiment, however, as shown in FIG. 2(c), a movable valve seat 28 moves relative to the valve body 4 during the jumping action of the negative pressure boosting device 1.

That is, in the negative pressure boosting device 1 of this embodiment, the set load $F_{ss0}$ of a control spring 29 is set to 0 or substantially 0.

The other structure of the negative pressure boosting device 1 of this embodiment is the same as that of the aforementioned embodiment shown in FIG. 2(b).

In the negative pressure boosting device 1 of this embodiment having the above structure, the control spring 29 starts to be compressed just after the valve element 12 is seated on the movable valve seat 28 by the forward movement of the valve plunger 10 upon depression of the brake pedal. Therefore, the movable valve seat 28 can starts to move relative to the valve body 4 during the jumping action of the negative pressure boosting device 1. That is, the negative pressure boosting device 1 is operated with a servo ratio smaller than the servo ratio for the normal operation as shown in FIG. 2(c). Then, similarly to the embodiment shown in FIG. 2(b), when the input reaches the preset value $F_2$ before the negative pressure boosting device reaches the full load range, the valve element 12 comes in contact with the first valve seat 13 so that the movable valve seat 28 stops relative to the valve body 4, thereby making the stroke $L_m$ of the movable valve seat 28 constant as shown in FIG. 2(b). After that, since the movable valve seat 28 moves together with the valve body 4, the servo ratio is changed to the servo ratio for the normal operation.

In the negative pressure boosting device 1 of this embodiment, the servo ratio is changed twice after input is initially exerted on the input shaft 11 and before the end of the intermediate load range of the negative pressure boosting device 1. In this case, the servo ratio is set to be smaller than the servo ratio for the normal operation over the entire intermediate load range. To prevent the servo ratio from being too small according to the increase in input, the servo ratio is returned to the servo ration for the normal operation when the input exceeds the preset value $F_2$. Therefore, the driver can be given further suitable stiff feeling over the entire intermediate load range.

The other works and effects of the negative pressure boosting device 1 of this embodiment are the same as those of the aforementioned embodiment shown in FIG. 2(b).

Also in the negative pressure boosting device 1 shown in FIG. 3, the predetermined value α of the space can be set such that the movable valve seat 28 starts to move relative to the valve body 4 during the jumping action of the negative pressure boosting device 1 and the front end 26a of the cylindrical member 26 comes in contact with the corresponding portion 4a of the valve body 4 when the input of the input shaft reaches the preset value $F_2$ in the intermediate load range before the negative pressure boosting device 1 reaches the full load range, thereby obtaining the input-output characteristic shown in FIG. 2(c). The effects of this case are the same as the effects of the aforementioned negative pressure boosting device 1 having the input-output characteristic shown in FIG. 2(c), except the effect of providing the first valve seat 13 of the aforementioned embodiment shown in FIG. 1.

Though the present invention is adopted to a negative pressure boosting device of a single type having one power piston 5 in any of the aforementioned embodiments, the present invention can be adopted to a negative pressure boosting device of a tandem type having a plurality of power pistons 5.

As apparent from the aforementioned description, according to the negative pressure boosting device of the present invention, the servo ratio can be changed after input is initially exerted on the input shaft and before the end of the intermediate load range of the negative pressure boosting device by the servo ratio changing means. Therefore, the servo ratio can be suitably set, thereby improving the controllability of the brakes in the low-input range, for example at an initial stage of service braking, and also giving the feeling as hard response, i.e. the stiff feeling to the driver in the high-input range, for example, during panic braking. In this manner, the improvement of "controllability of brakes" in the low-input range and the improvement of "stiff feeling" in the high-input range are compatible.

Since the servo ratio changing means is provided in the valve mechanism, thereby obtaining improved controllability and certainty of changing of servo ratios by the servo ratio changing means.

Since the servo ratio changing means sets the servo ratio to a ratio smaller than the servo ratio for the normal braking operation, or sets the servo ratio to a ratio smaller than the servo ratio for the normal braking operation and then sets the servo ratio to the servo ratio for the normal braking operation again, thereby improving the controllability of brakes in the low-input range, while giving the feeling as hard response, i.e. the stiff feeling to the driver, for example, during panic braking in the high-input range.

The servo ratio changing means is composed of a movable valve seat of a vacuum valve and a control spring for controlling the start of movement of the movable valve seat relative to a valve body, thereby simplifying the structure of the servo ratio changing means.

Further, a stopper is engaged with the valve body by the biasing force of a control spring so as to define the inoperative position of the movable valve seat, thereby easily controlling and securely setting the inoperative position of the movable valve seat with a simple structure.

Furthermore, according to the invention, the movable valve seat is disposed slidably along the inner surface of the concavity formed in the valve body and the control spring is compressed and disposed between the valve body and the movable valve seat, thereby simplifying the structure of the valve mechanism even through it includes the servo ratio changing means.

What we claim is:

1. A negative pressure boosting device comprising:

a shell having a space therein;

a valve body which is disposed slidably relative to an inside of the space defined by the shell and air-tightly and slidably penetrates said shell;

a power piston, connected to said valve body, for dividing said space into a constant pressure chamber into which negative pressure is introduced and a variable pressure chamber into which atmosphere is introduced during braking operation;

a valve plunger which is slidably disposed in said valve body;

an input shaft which connected to said valve plunger and is slidably disposed in said valve body; end a valve mechanism comprising a vacuum valve, which is disposed in said valve body and is controlled by a movement of said valve plunger to isolate or allow communication between said constant pressure chamber and said variable pressure chamber, and an atmospheric valve which is disposed in said valve body and is controlled by the movement of said valve plunger to isolate or allow the communication between said variable pressure chamber and the atmosphere, said vacuum valve including a valve element for receiving working pressure corresponding to input exerted on the input shaft to move in a working direction and a movable valve seat movable relative to the valve body, on which the valve element is seated; and servo ratio changing means for changing a servo ratio during the breaking operation after the input is initially exerted on said input shaft and before the input reaches an end of an intermediate load range, said servo ratio changing means being formed of said movable valve seat and a control spring for controlling a start of movement of the movable valve seat relative to the valve body.

2. A negative pressure boosting device as claimed in claim 1, wherein said servo ratio changing means sets the servo ratio to a ratio smaller than the servo ratio for the normal braking operation, or sets the servo ratio to a ratio smaller than the servo ratio for the normal braking operation and, after that, sets the servo ratio to the servo ratio for the normal braking operation again.

3. A negative pressure boosting device as claimed in claim 1, wherein said movable valve seat is always biased by the biasing force of said control spring toward an inoperative position and has a stopper which is engageable with said valve body, said movable valve seat becoming the inoperative position when said stopper is engaged with said valve body by the biasing force of said control spring.

4. A negative pressure boosting device as claimed in claim 1, wherein said movable valve seat is disposed slidably along an inner surface of a concavity formed in said valve body and that said control spring is compressed and disposed between said valve body and said movable valve seat.

* * * * *